United States Patent
Yang et al.

(10) Patent No.: US 11,522,922 B2
(45) Date of Patent: Dec. 6, 2022

(54) MULTIMEDIA DATA PROCESSING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventors: Yong Yang, Shenzhen (CN); Yunfei Zhang, Shenzhen (CN); Huaheng Fan, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/469,872

(22) Filed: Sep. 8, 2021

(65) Prior Publication Data
US 2021/0409460 A1   Dec. 30, 2021

Related U.S. Application Data

(63) Continuation of application No. PCT/CN2020/092750, filed on May 28, 2020.

(30) Foreign Application Priority Data

Jun. 28, 2019  (CN) .......................... 201910578317.6

(51) Int. Cl.
*H04L 65/1069*   (2022.01)
*H04L 65/75*   (2022.01)

(52) U.S. Cl.
CPC ........ *H04L 65/1069* (2013.01); *H04L 65/764* (2022.05)

(58) Field of Classification Search
None
See application file for complete search history.

(56) References Cited

U.S. PATENT DOCUMENTS

| | | |
|---|---|---|
| 2005/0021626 A1 | 1/2005 | Prajapat et al. |
| 2005/0060411 A1 | 3/2005 | Coulombe et al. |
| 2009/0313378 A1 | 12/2009 | Mahdi et al. |

(Continued)

FOREIGN PATENT DOCUMENTS

| | | |
|---|---|---|
| CN | 1774707 A | 5/2006 |
| CN | 101123718 A | 2/2008 |

(Continued)

OTHER PUBLICATIONS

The World Intellectual Property Organization (WIPO) International Search Report for PCT/CN2020/092750 dated Aug. 19, 2020 5 Pages (including translation).

(Continued)

*Primary Examiner* — June Sison
(74) *Attorney, Agent, or Firm* — Anova Law Group PLLC (57) ABSTRACT

A multimedia data processing method is provided. The multimedia data processing method includes: establishing, by a signaling processing module deployed on a remote node, a session between a terminal device and a media processing module, and controlling the session; and receiving, by the media processing module deployed on an edge computing node after the session is established with the terminal device, multimedia data transmitted by the terminal device, and processing the multimedia data.

18 Claims, 7 Drawing Sheets

---

S510 — A signaling processing module deployed on a remote node establishes a session between a terminal device and a media processing module, and controls the session S520 — The media processing module deployed on an edge computing node receives, after the session is established between the media processing module and the terminal device, multimedia data transmitted by the terminal device, and processes the multimedia data (56) References Cited

U.S. PATENT DOCUMENTS

| | | |
|---|---|---|
| 2016/0359814 A1 | 12/2016 | Perrine et al. |
| 2017/0054770 A1* | 2/2017 | Wells .................... H04L 65/608 |
| 2018/0049179 A1 | 2/2018 | Shah |
| 2018/0324235 A1 | 11/2018 | Mufti |
| 2018/0376444 A1 | 12/2018 | Kim et al. |
| 2019/0104434 A1 | 4/2019 | Duan et al. |
| 2019/0215729 A1* | 7/2019 | Oyman ................ H04L 5/0082 |
| 2019/0357014 A1 | 11/2019 | Hu et al. |
| 2019/0379735 A1* | 12/2019 | Huang .................. H04L 67/141 |
| 2020/0120665 A1 | 4/2020 | Jin et al. |
| 2020/0220905 A1* | 7/2020 | Park ....................... H04L 69/24 |
| 2021/0352042 A1* | 11/2021 | You ..................... H04L 67/2842 |
| 2022/0038378 A1* | 2/2022 | Zhang .................. H04L 47/125 |
| 2022/0086218 A1* | 3/2022 | Sabella .................. H04L 67/10 |

FOREIGN PATENT DOCUMENTS

| | | |
|---|---|---|
| CN | 102090139 A | 6/2011 |
| CN | 102281251 A | 12/2011 |
| CN | 103179213 A | 6/2013 |
| CN | 107172664 A | 9/2017 |
| CN | 107466482 A | 12/2017 |
| CN | 107566437 A | 1/2018 |
| CN | 107690790 A | 2/2018 |
| CN | 108063773 A | 5/2018 |
| CN | 108234511 A | 6/2018 |
| CN | 108355350 A | 8/2018 |
| CN | 108496341 A | 9/2018 |
| CN | 108521882 A | 9/2018 |
| CN | 108738104 A | 11/2018 |
| CN | 109218455 A | 1/2019 |
| CN | 110290140 A | 9/2019 |
| WO | 2017012674 A1 | 1/2017 |

OTHER PUBLICATIONS

The State Intellectual Property Office of the People's Republic of China (SIPO) Office Action 1 for for 201910578317.6 dated Feb. 20, 2021 10 Pages (including translation).

The European Patent Office (EPO) the Extended European Search Report for 20832485.5 dated Jul. 1, 2022 11 pages.

Tae-Gyu Kang et al., "SIP/SDP signaling of media gateway with transcoding function in converged network," The 6th International Conference on Advanced Communication Technology, 2004, Phoenix Park, Korea, Feb. 9-11, 2004, Piscataway, NJ, USA, IEEE, Feb. 9, 2004 (Feb. 9, 2004), pp. 842-845. 4 pages.

* cited by examiner

MULTIMEDIA DATA PROCESSING METHOD AND APPARATUS, STORAGE MEDIUM, AND ELECTRONIC DEVICE

RELATED APPLICATION(S)

This application is a continuation application of PCT Patent Application No. PCT/CN2020/092750 filed on May 28, 2020, which claims priority to Chinese Patent Application No. 201910578317.6, entitled "MULTIMEDIA DATA PROCESSING METHOD AND APPARATUS, STORAGE MEDIUM, AND ELECTRONIC DEVICE" and filed with the National Intellectual Property Administration, PRC on Jun. 28, 2019, all of which are incorporated herein by reference in entirety.

FIELD OF THE TECHNOLOGY

The present disclosure relates to the field of communication technologies, and more particularly, to a multimedia data processing technology.

BACKGROUND

Edge computing is a distributed computing architecture. In this architecture, for computing such as implementation processing and data analysis, a large-scale service that is processed by a remote node may be decomposed into smaller and more easily manageable parts, and the parts are distributed to edge computing nodes for processing. Because the edge computing nodes are closer to user terminal devices, data processing and transmission can be accelerated, thereby reducing latency.

In the related art, a service server is usually deployed on an edge computing node, to implement a high-quality and low-latency service. However, certain existing edge computing-based multimedia data processing methods generally have problems such as high deployment complexity and low system operation and maintenance efficiency.

Information partially disclosed in the background part is only used for enhancing the understanding of the background of the present disclosure, and therefore, may include information that does not constitute a limitation on the related art known to a person of ordinary skill in the art.

SUMMARY

Embodiments of the present disclosure provide a multimedia data processing method, a multimedia data processing apparatus, an electronic device, and a computer-readable storage medium, which can reduce deployment complexity of an edge computing system and improving system operation and maintenance efficiency.

In one aspect, the present disclosure provides a multimedia data processing method. The multimedia data processing method is performed by a server and includes: establishing, by a signaling processing module deployed on a remote node, a session between a terminal device and a media processing module, and controlling the session; and receiving, by the media processing module deployed on an edge computing node after the session is established between the media processing module and the terminal device, multimedia data transmitted by the terminal device, and processing the multimedia data.

In another aspect, the present disclosure provides a multimedia data processing apparatus. The multimedia processing apparatus includes a memory storing computer program instructions, and a processor coupled to the memory and configured to execute the computer program instructions and perform: establishing, by a signaling processing module deployed on a remote node, a session between a terminal device and a media processing module, and controlling the session; and receiving, by the media processing module deployed on an edge computing node after the session is established between the media processing module and the terminal device, multimedia data transmitted by the terminal device, and processing the multimedia data.

In yet another aspect, the present disclosure provides a non-transitory computer-readable storage medium storing computer program instructions executable by at least one processor to perform: establishing, by a signaling processing module deployed on a remote node, a session between a terminal device and a media processing module, and controlling the session; and receiving, by the media processing module deployed on an edge computing node after the session is established between the media processing module and the terminal device, multimedia data transmitted by the terminal device, and processing the multimedia data.

The exemplary embodiments of the present disclosure may have some or all of the following beneficial effects:

In the multimedia data processing method provided in the embodiments of the present disclosure, a media processing module is deployed on an edge computing node, a signaling processing module is deployed on a remote node, the signaling processing module establishes a session between a terminal device and the media processing module, and controls the session, and the media processing module receives multimedia data transmitted by the terminal device, and processes the multimedia data. On one hand, the signaling processing module may only need to process control signaling, and quantities of network resources and computing resources occupied by the signaling processing module are not large, so that one signaling processing module may be simultaneously responsible for sessions between a plurality of media processing modules distributed on different edge computing nodes and a plurality of terminal devices. Therefore, based on the method in the embodiments of the present disclosure, a deployment mode applied to a multimedia data processing can be simplified, to significantly reduce deployment complexity of the edge computing nodes; and infrastructure resources that may need to be deployed on the edge computing nodes can further be reduced, thereby reducing deployment costs. On the other hand, because the signaling processing module is deployed on the remote node, installation, upgrade, and maintenance of the signaling processing module also become simpler and more convenient. In addition, there is only a stateless media processing module in the edge computing node, so that an edge computing service deployed in the edge computing node becomes a consistent single service type, and management and operation and maintenance work on the edge computing node become more efficient. Therefore, based on the method in this exemplary implementation, the operation and maintenance efficiency of the entire system can be greatly improved, and operation and maintenance costs can be reduced.

It is to be understood that, the foregoing general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Exemplary implementations are described more comprehensively with reference to the accompanying drawings. However, the exemplary implementations can be implemented in various forms, and are not to be understood as being limited to the examples described herein. Instead, the implementations are provided to make the present disclosure more comprehensive and fully convey the idea of the exemplary implementations to a person skilled in the art. The described features, structures, or characteristics may be combined in one or more implementations in any appropriate manner. In the following description, many specific details are provided to give a full understanding of the implementations of the present disclosure. However, it is to be appreciated by a person skilled in the art that one or more of the specific details may be omitted during practice of the technical solutions of the present disclosure, or other methods, components, apparatus, steps, or the like may be used.

In other scenarios, well-known technical solutions are not shown or described in detail to avoid obscuring aspects of the present disclosure.

In addition, the accompanying drawings are only schematic illustrations of the present disclosure and are not necessarily drawn to scale. The same reference numbers in the drawings represent the same or similar parts, and therefore, repeated descriptions thereof are omitted. Some of the block diagrams shown in the accompanying drawings are functional entities and do not necessarily correspond to physically or logically independent entities. The functional entities may be implemented in the form of software, or implemented in one or more hardware modules or integrated circuits, or implemented in different networks and/or processor apparatuses and/or micro-controller apparatuses.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1:
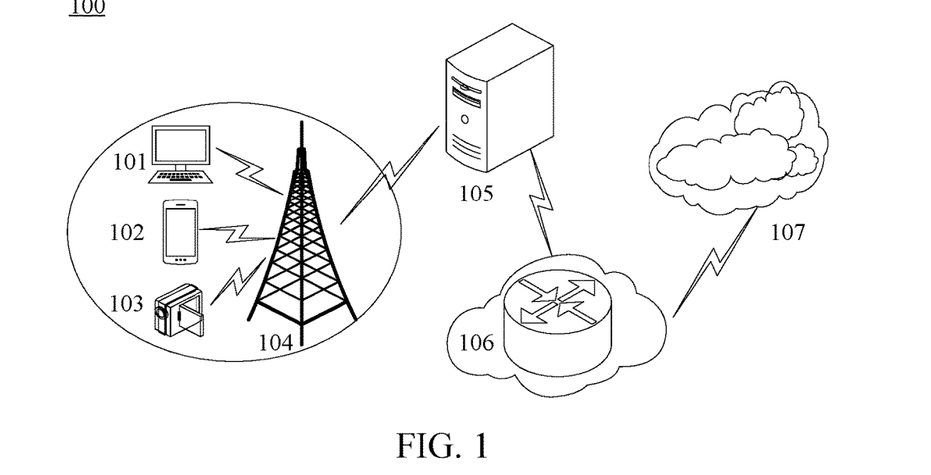
FIG. 1 is a schematic diagram of an exemplary system architecture to which a multimedia data processing method and apparatus according to one or more embodiments of the present disclosure is applicable.

FIG. 1 is a schematic diagram of a system architecture of an implementation environment of a multimedia data processing method according to an embodiment of the present disclosure.

As shown in FIG. 1, the system architecture 100 may include one or more of terminal devices 101, 102, and 103, a base station 104, an edge computing node 105, a local network computing platform 106, and an Internet computing platform 107. The edge computing node 105 may be a computing platform close to a network access location, and may be located in an edge data center (DC). The local network computing platform 106 and the Internet computing platform 107 may be used as remote nodes in the present disclosure. The local network computing platform 106 may be located in a local DC. The Internet computing platform 107 may be located in an Internet data center (IDC). In addition, the system architecture is a three-layer network structure in FIG. 1, and may be alternatively a two-layer network structure in another exemplary embodiment. That is, the edge computing node 105 may be directly communicatively connected to the Internet computing platform 107. The system architecture may be alternatively a network structure of more than three layers. This is not particularly limited in this exemplary embodiment.

The terminal devices 101, 102, and 103 may be various electronic devices, including, but not limited to, cameras, desktop computers, portable computers, smartphones, tablet computers, and the like. Each of the edge computing node 105, the local network computing platform 106, and the Internet computing platform 107 includes a server. It is to be understood that the quantity of terminal devices, the quantity of networks, and the quantity of servers in FIG. 1 are merely exemplary. There may be any quantity of terminal devices, networks, and servers according to implementation requirements. For example, the edge computing node 105, the local network computing platform 106, and the Internet computing platform 107 may be a server cluster including a plurality of servers. In another example, the local network computing platform 106 and the Internet computing platform 107 may be alternatively cloud computing platforms, thereby implementing an edge-cloud collaboration architecture. That is, the edge computing node and remote cloud computing platforms function collaboratively.

The multimedia data processing method provided in the embodiments of the present disclosure is generally performed by a server, and correspondingly, a multimedia data processing apparatus is generally disposed in the server. For example, in an exemplary embodiment, a mobile edge computing (MEC) application may be deployed on the edge computing node 105, to implement quick downloading of various content, services, and applications in a network, to provide consumers with uninterrupted high-quality network experience. Network traffic that is not processed by the MEC application may be forwarded to a UPF entity in the local network computing platform 106 by a UPF entity in the edge computing node 105, and finally enter the Internet computing platform 107.

Figure 2:
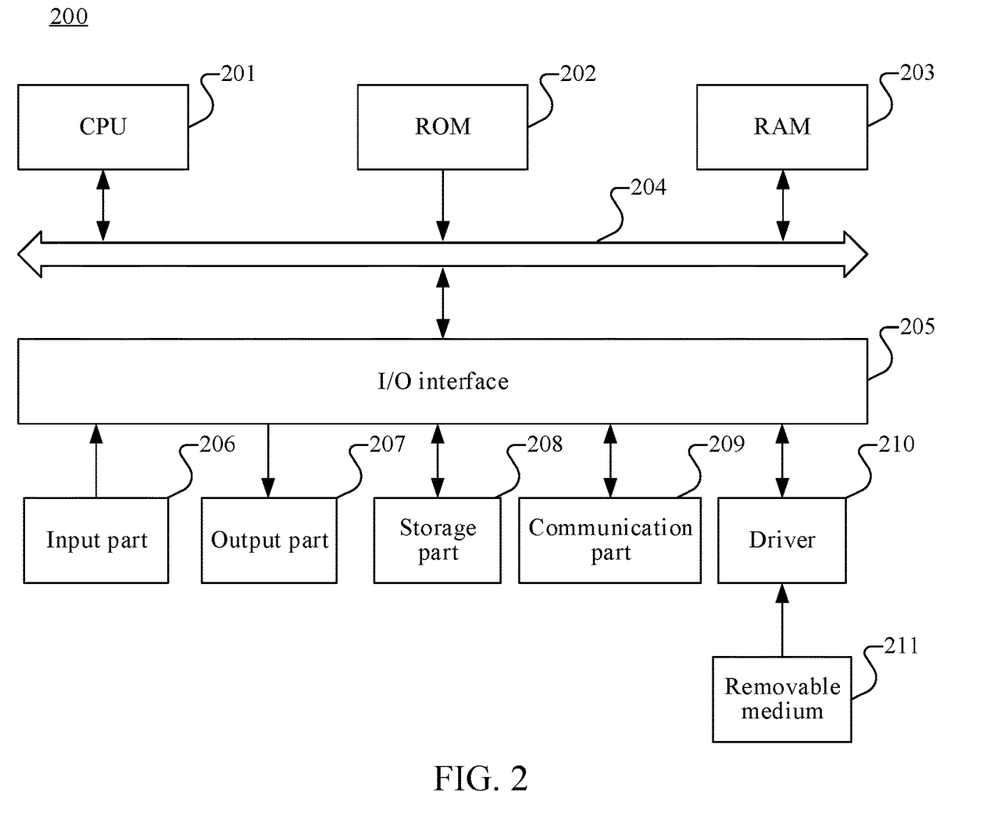
FIG. 2 is a schematic structural diagram of a computer system adapted to implement an electronic device according to one or more embodiments of the present disclosure.

FIG. 2 is a schematic structural diagram of a computer system adapted to implement an electronic device according to an embodiment of the present disclosure.

A computer system 200 of the electronic device shown in FIG. 2 is merely an example, and does not constitute any limitation on functions and use ranges of the embodiments of the present disclosure.

As shown in FIG. 2, the computer system 200 includes a central processing unit (CPU) 201. The CPU may perform various appropriate actions and processing according to a program stored in a read-only memory (ROM) 202 or a program loaded from a storage portion 208 into a random access memory (RAM) 203. The RAM 203 further stores various programs and data required for system operations. The CPU 201, the ROM 202, and the RAM 203 are connected to each other by using a bus 204. An input/output (I/O) interface 205 is also connected to the bus 204.

The following components are connected to the I/O interface 205: an input part 206 including a keyboard, a mouse, or the like, an output part 207 including a cathode ray tube (CRT), a liquid crystal display (LCD), a speaker, or the like, a storage part 208 including a hard disk, or the like, and a communication part 209 including a network interface card such as a local area network (LAN) card or a modem. The communication part 209 performs communication processing by using a network such as the Internet. A driver 210 is also connected to the I/O interface 205 as required. A removable medium 211, such as a magnetic disk, an optical disc, a magneto-optical disk, or a semiconductor memory, is installed on the drive 210 as required, so that a computer program read from the removable medium is installed into the storage part 208 as required.

Particularly, according to an embodiment of the present disclosure, the processes described in the following by referring to the flowcharts may be implemented as computer software programs. For example, this embodiment of the present disclosure includes a computer program product, the computer program product includes a computer program carried on a computer-readable medium, and the computer program includes program code used for performing the methods shown in the flowcharts. In such an embodiment, the computer program may be downloaded and installed from a network through the communication part 209, and/or installed from the removable medium 211. When the computer program is executed by the CPU 201, various functions defined in the method and apparatus of the present disclosure are executed. In some embodiments, the computer system 200 may further include an artificial intelligence (AI) processor. The AI processor is configured to process computing operations related to machine learning.

The computer-readable medium shown in the present disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disk read-only memory (CD-ROM), an optical storage device, a magnetic storage device, or any appropriate combination thereof.

In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code contained in the computer readable medium may be transmitted by using any appropriate medium, including but not limited to: a wireless medium, a wire, an optical cable, radio frequency (RF), any suitable combination thereof, or the like.

The flowcharts and block diagrams in the accompanying drawings illustrate possible system architectures, functions and operations that may be implemented by a system, a method, and a computer program product according to various embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in certain particular implementations.

According to another aspect, the present disclosure further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the following embodiments.

The technical solutions in the embodiments of the present disclosure are described below in detail.

Based on an edge computing network deployment architecture shown in FIG. 1, there may be different solutions for different implementation scenarios.

Figure 3:
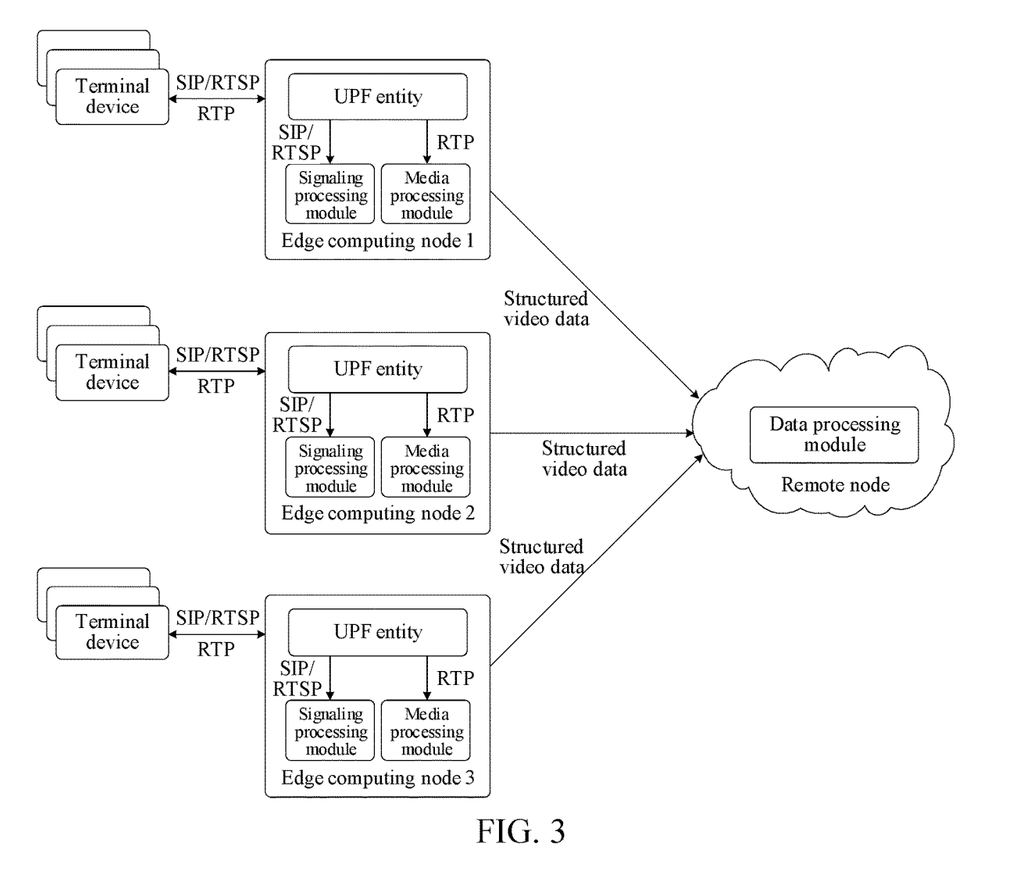
FIG. 3 is a schematic diagram of a deployment architecture of a multimedia data processing apparatus according to one or more embodiments of the present disclosure.

A video surveillance implementation scenario based on edge computing is used as an example. An implementation is shown in FIG. 3. In this implementation solution, a signaling processing module and a media processing module are deployed on an edge computing node. The signaling processing module controls access of a video. The media processing module performs video analysis based on a graphics processing unit (GPU) and a deep neural network on the received video, to output structured video data, and then transmits the structured video data to a data processing module deployed on a remote node. The data processing module performs processing such as retrieval and analysis based on the structured video data.

Based on this implementation solution, on one hand, the edge computing node deployed on a user side performs video session signaling processing and media processing, thereby improving video real-time processing efficiency. On the other hand, the data processing module deployed on the remote node receives and processes the structured video data transmitted by the edge computing node, which can avoid transmission of original video media data between the edge computing node and the remote node, thereby effectively decreasing a requirement for network bandwidth between the edge computing node and the remote node.

A video on-demand implementation scenario based on edge computing is used as an example. An implementation is: deploying a signaling processing module and a media processing module on an edge computing node including a stream media server, and deploying a content delivery network (CDN) management server on a remote node. When a user requests a stream media on-demand service, the request is first submitted to the CDN management server deployed on the remote node. The CDN management server selects, according to a corresponding policy, a stream media server deployed in the corresponding edge computing node, and forwards the request of the user to the stream media server, to provide the user with a nearest high-quality and low-latency video on-demand service. In addition, video data transmission between a user terminal device and the remote node is reduced.

In the implementation solutions of the two foregoing scenarios, a service server may need to be deployed on each edge computing node, and the service server includes a signaling processing module and a media processing module. The signaling processing module and the media processing module are simultaneously deployed on the edge computing node, which increases system deployment complexity, and increases system deployment costs. In addition, during system upgrade or expansion, the signaling processing module and the media processing module that are deployed in each edge computing node may need to be separately upgraded or expanded, and system operation and maintenance efficiency and costs are relatively high.

In a multimedia session service system, the signaling processing module is responsible for establishing a media session. Throughout one session from initiation to end, the entire signaling interaction occupies very few computing resources, and compared with network resources occupied by media transmission, network resources occupied by the entire signaling interaction may be omitted. Based on the above, the present disclosure provides a multimedia data processing method. The multimedia data processing method may be applicable to a multimedia session implementation-oriented deployment architecture shown in FIG. 4.

Figure 4:
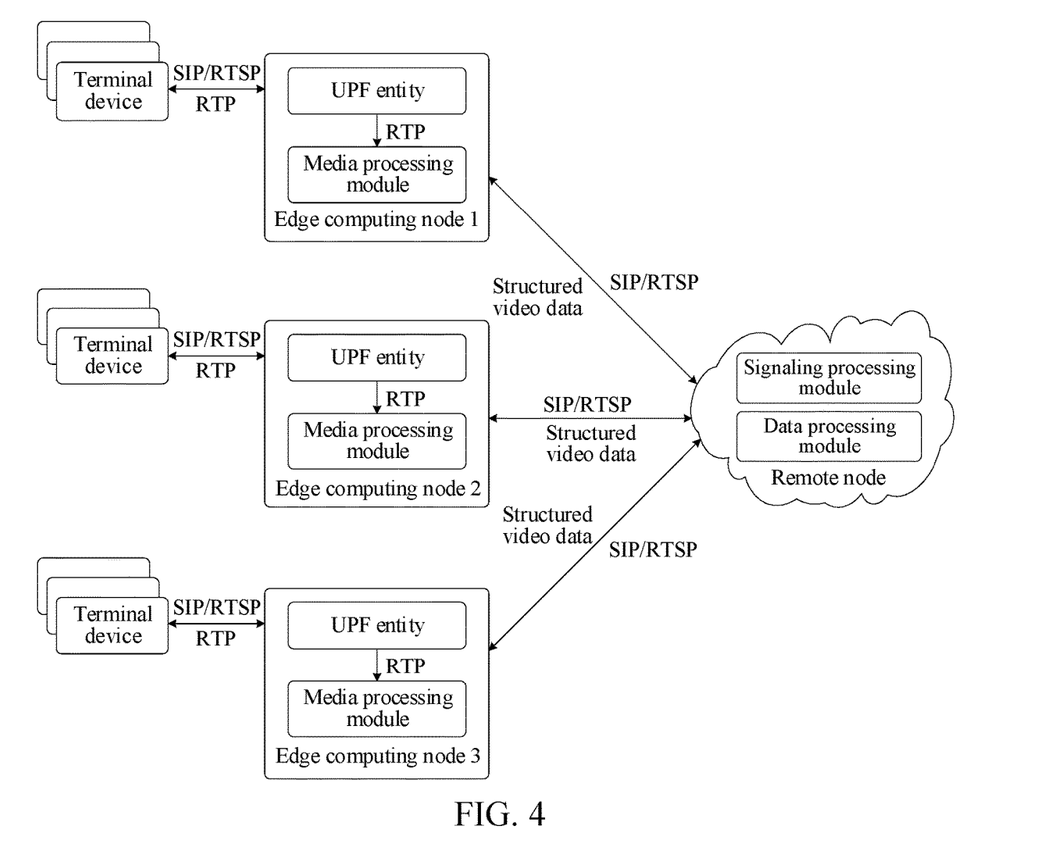
FIG. 4 is a schematic diagram of a deployment architecture of a multimedia data processing apparatus according to one or more embodiments of the present disclosure.

Referring to FIG. 4, in the deployment architecture, a multimedia data processing apparatus includes a signaling processing module and media processing modules. The signaling processing module is deployed on a remote node, for example, the foregoing local network computing platform 106 or Internet computing platform 107. The media processing module is deployed on an edge computing node 105, to implement a simple and flexible edge computing implementation. Based on the deployment architecture, signaling processing of multimedia sessions between user terminal devices and the multimedia data processing apparatus is performed by the signaling processing module deployed on the remote node, and multimedia processing between the user terminal devices and the multimedia data processing apparatus is performed by the media processing modules deployed on edge computing nodes in a scattered manner.

Figure 5:
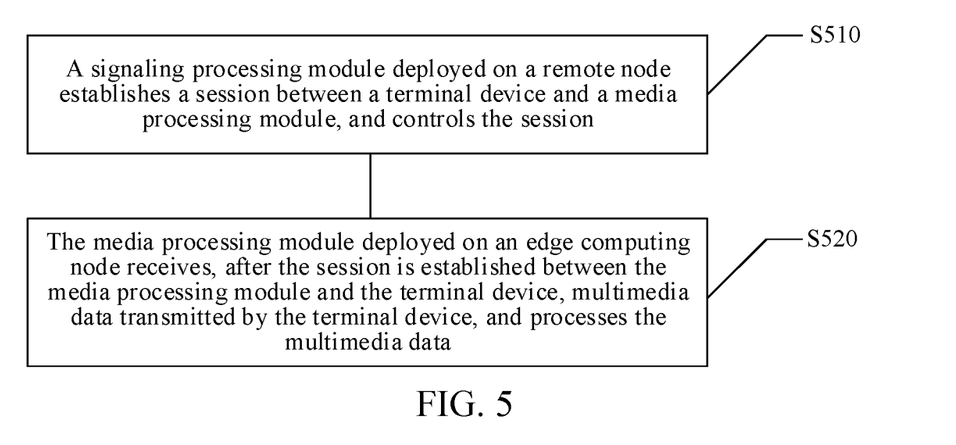
FIG. 5 is a schematic flowchart of a multimedia data processing method according to an embodiment of the present disclosure.

The multimedia data processing method based on the foregoing deployment architecture is described below with reference to FIG. 5. Referring to FIG. 5, the method may include the following step S510 and step S520.

Step S510: A signaling processing module deployed on a remote node establishes a session between a terminal device and a media processing module, and controls the session.

In this exemplary implementation, the session is a process in which a terminal device communicates with a media processing module. The signaling processing module may establish a session between the terminal device and the media processing module. In addition, the signaling processing module may further control the session to be kept and end the session.

The signaling processing module is generally deployed on a remote room. A video surveillance implementation scenario is used as an example. Protocols supported by the signaling processing module may include multimedia session protocols such as a session initiation protocol (SIP) and a real-time stream protocol (RTSP). According to different implementation scenarios and requirements, protocols supported by the signaling processing module may alternatively include other multimedia session protocols such as an HTTP Live Streaming (HLS) and a real time messaging protocol (RTMP). In a non-multimedia session implementation scenario, the signaling processing module may further support a non-multimedia session protocol. This exemplary embodiment is not limited thereto.

Figure 6:
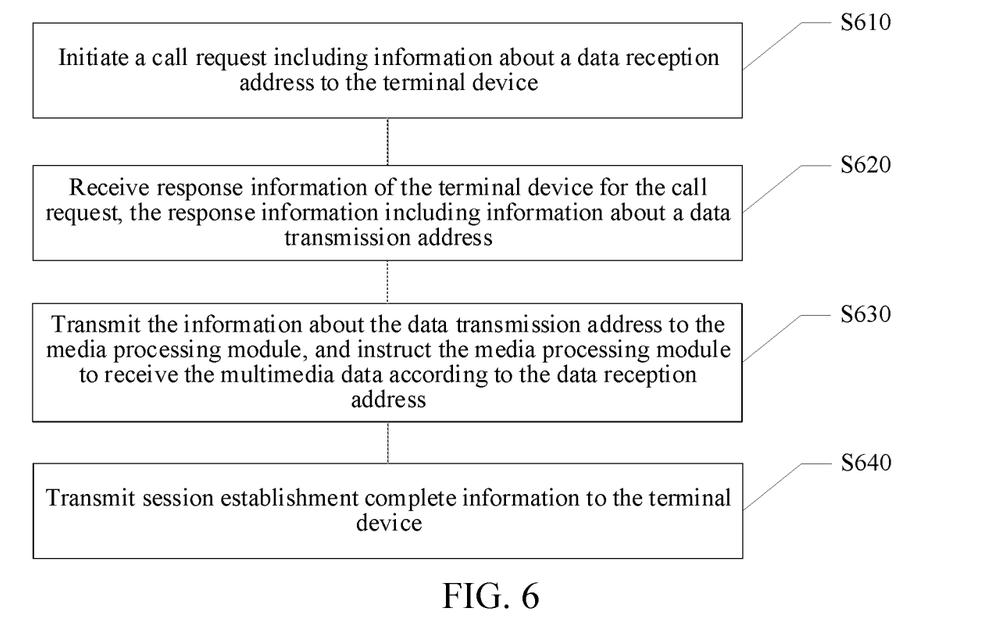
FIG. 6 is a schematic flowchart of a process of establishing a multimedia session according to one or more embodiments of the present disclosure.

Referring to FIG. 6, in this exemplary implementation, the session between the terminal device and the media processing module may be established through the following step S610 to step S640. Details are as follows:

Step S610: Initiate a call request including information about a data reception address to the terminal device.

For example, after receiving a camera video access request initiated by a service administrator, the signaling processing module may initiate, for example, a SIP\RTSP call request to a camera. The call request may include, for example, information about a data reception address in a session description protocol (SDP) format. The information about the data reception address may include information such as an IP address of the media processing module and a connection port number.

Step S620: Receive response information of the terminal device for the call request, the response information including information about a data transmission address.

For example, after receiving the call request of the signaling processing module, the camera may return response information to the signaling processing module. The response information may include, for example, information about a data transmission address in an SDP format. The information about the data transmission address may include information such as a camera identifier (for example, an ID) and a source IP address and a transport port number that are used for transmitting multimedia data by the camera.

Step S630: Transmit the information about the data transmission address to the media processing module, and instruct the media processing module to receive the multimedia data according to the data reception address.

Step S640: Transmit session establishment information to the terminal device.

During the session, a UPF entity may directly exchange protocols of a control plane such as a SIP or an RTSP between the terminal device and the signaling processing module according to a configuration policy. In this exemplary implementation, the UPF entity may be a user plane device in a 5G network, but is not limited thereto. For example, the UPF entity may be alternatively a non-mobile communication gateway device such as a wireless access gateway (for example, a Wi-Fi gateway) or a wired access gateway. Forwarding policies of the UPF entity for multimedia data may include a static policy and a dynamic policy. Details are as follows:

Based on the static policy, a forwarding policy may need to be pre-configured in a UPF entity deployed on the edge computing node, the forwarding policy including: forwarding multimedia data whose receiving port is within a preset range to the media processing module, the information about the data reception address including a target receiving port within the preset range.

In addition, during multimedia session negotiation, it is necessary to require that the terminal device set a receiving port in the preset range. The foregoing video surveillance implementation scenario is used as an example. Based on a SIP, during SDP negotiation, the camera may need to limit the target receiving port of the transmitted multimedia data to 10000 to 20000, and a forwarding policy is then configured in the UPF entity. Any received IP packet, for example, a user datagram protocol (UDP) packet, that is of a real-time transport protocol (RTP) type, whose target receiving port is in a range of 10000 to 20000, and that is transmitted by the camera is forwarded to a port corresponding to the media processing module.

Figure 7:
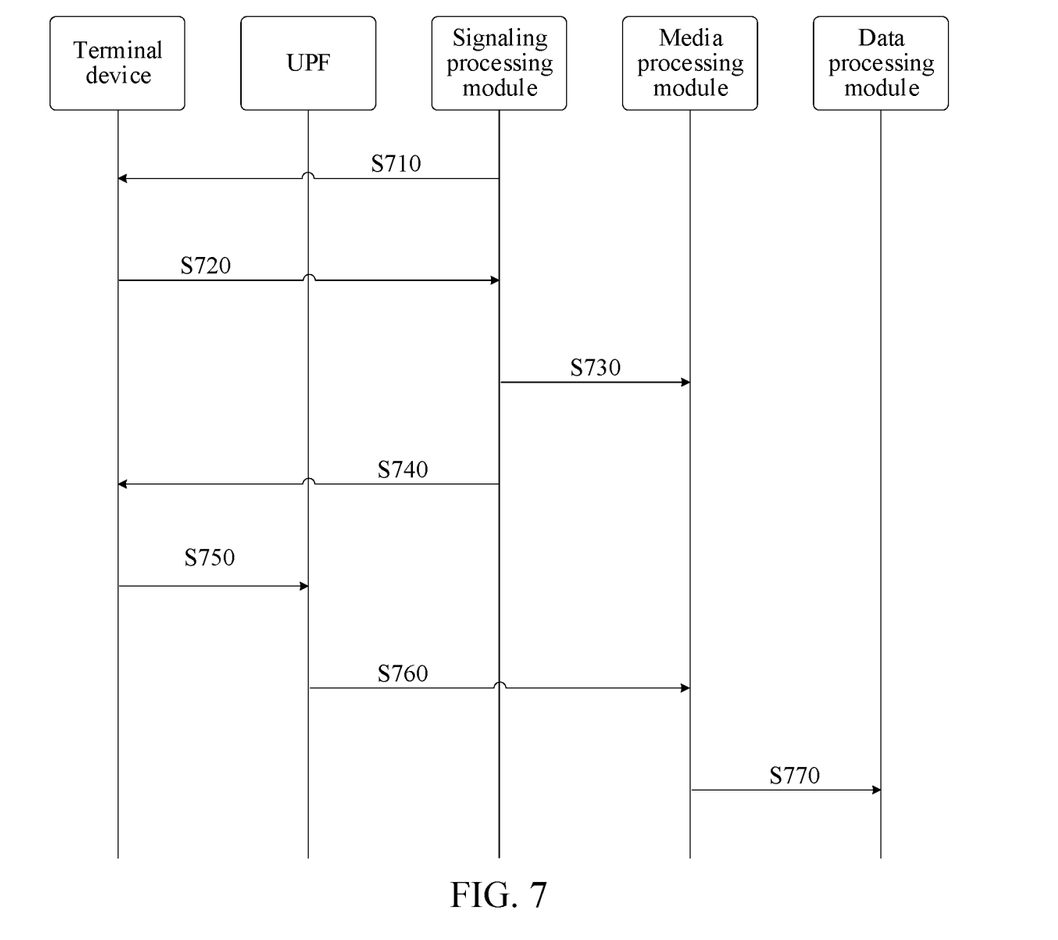
FIG. 7 is a schematic interaction flowchart of a process of establishing a multimedia session according to one or more embodiments of the present disclosure.

FIG. 7 is a schematic diagram of a process of a session based on a static policy. The process includes step S710 to step S760. Details are as follows:

Step S710: After receiving a camera video access request initiated by a service administrator, the signaling processing module initiates a SIP\RTSP call request to a camera. The call request may include, for example, information about a data reception address in an SDP format. The information about the data reception address may need to limit that a data receiving port is a free port A within a range of 10000 to 20000. A connection address is specified as an IP address of the media processing module.

Step S720: After receiving the call request of the signaling processing module, the camera may return response information to the signaling processing module. The response information may include, for example, information about a data transmission address in an SDP format. The information about the data transmission address may include information such as a camera identifier (for example, an ID) and a source IP address and a transport port number that are used for transmitting multimedia data by the camera.

Step S730: After receiving the response information of the camera, the signaling processing module transmits an instruction to the media processing module, the instruction including information such as the camera identifier and the source IP address and the transport port number that are used for transmitting the multimedia data by the camera, to instruct the media processing module to prepare to start to receive, at the port A, the multimedia data transmitted by the camera.

Step S740: The signaling processing module transmits session establishment information to the terminal device, to confirm that the session has been established.

Step S750: The camera starts to transmit a multimedia data packet to the UPF entity of the edge computing node, a target receiving port of the multimedia data packet being the port A.

Step S760: After receiving the multimedia data packet transmitted by the camera, the UPF entity of the edge computing node forwards the multimedia data packet to the port A of the media processing module according to a preset forwarding policy.

Based on the dynamic policy, the information about the data reception address includes a target receiving port; and before the step of transmitting the information about the data transmission address to the media processing module, the method further includes: configuring a forwarding policy in a UPF entity deployed on the edge computing node, the forwarding policy including: forwarding multimedia data whose receiving port is the target receiving port to the media processing module.

The foregoing video surveillance implementation scenario is used as an example. For example, based on a SIP, a free port B may be randomly selected as a target receiving port during SDP negotiation, and a forwarding policy is then configured in the UPF entity. Any received IP packet, for example, a UDP packet, that is of an RTP type, whose target receiving port is the port B, and that is transmitted by the camera is forwarded to the port B corresponding to the media processing module.

Figure 8:
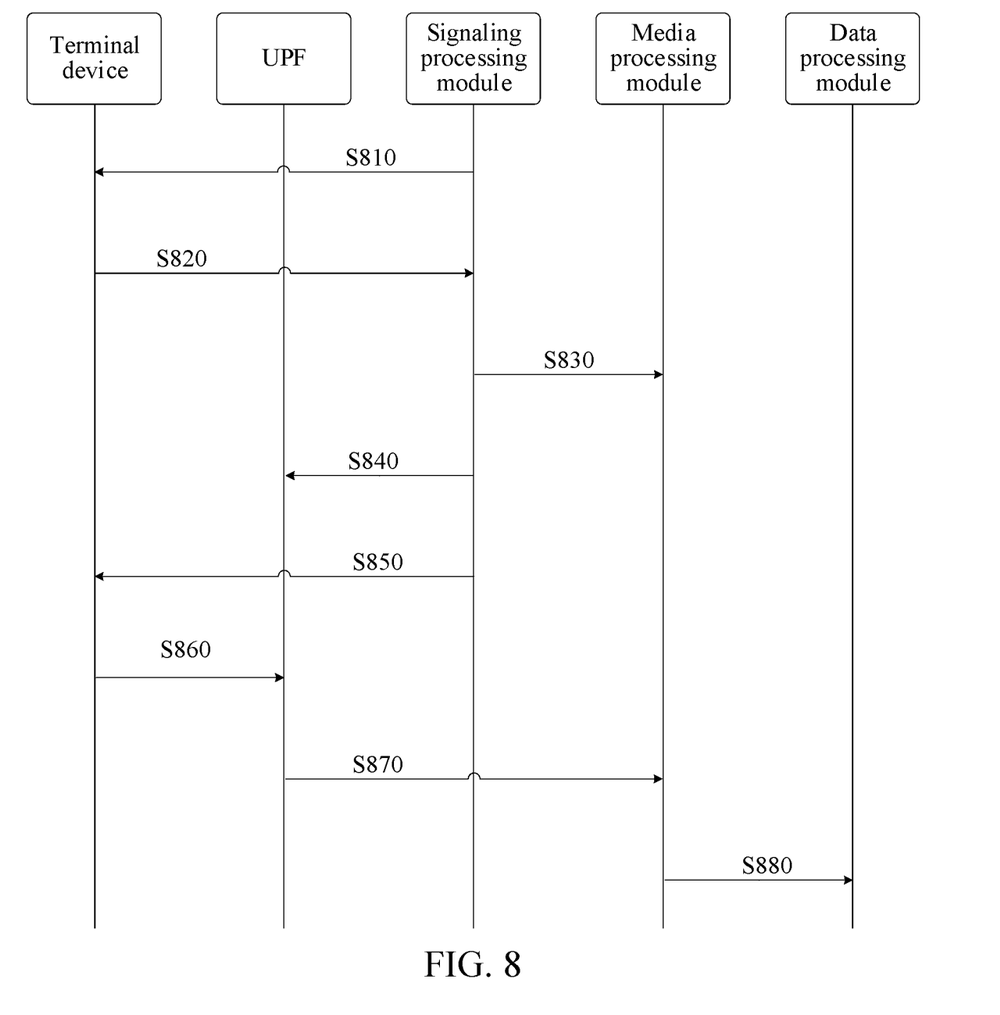
FIG. 8 is a schematic interaction flowchart of a process of establishing a multimedia session according to one or more embodiments of the present disclosure.

FIG. 8 is a schematic diagram of a process of a session based on a dynamic policy. The process includes step S810 to step S870. Details are as follows:

Step S810: After receiving a camera video access request initiated by a service administrator, the signaling processing module initiates a SIP\RTSP call request to a camera. The call request may include, for example, information about a data reception address in an SDP format. The information about the data reception address may need to limit that a data receiving port is a randomly selected free port B. A connection address is specified as an IP address of the media processing module.

Step S820: After receiving the call request of the signaling processing module, the camera may return response information to the signaling processing module. The response information may include, for example, information about a data transmission address in an SDP format. The information about the data transmission address may include information such as a camera identifier (for example, an ID), and a source IP address and a transport port number that are used for transmitting multimedia data by the camera.

Step S830: After receiving the response information of the camera, the signaling processing module transmits an instruction to the UPF entity, to set a forwarding policy of the UPF entity. The forwarding policy requires that any received IP packet, for example, a UDP packet, that is of an RTP type, whose target receiving port is the port B, and that is transmitted by the camera is forwarded to the port B corresponding to the media processing module.

Step S840: The signaling processing module transmits an instruction to the media processing module, the instruction including information such as the camera identifier and the source IP address and the transport port number that are used for transmitting the multimedia data by the camera, to instruct the media processing module to prepare to start to receive, at the port B, the multimedia data transmitted by the camera.

Step S850: The signaling processing module transmits session establishment information to the terminal device, to confirm that the session has been established.

Step S860: The camera starts to transmit a multimedia data packet to the UPF entity of the edge computing node, a target receiving port of the multimedia data packet being the port B.

Step S870: After receiving the multimedia data packet transmitted by the camera, the UPF entity of the edge computing node forwards the multimedia data packet to the port B of the media processing module according to a preset forwarding policy.

In addition, after the session is ended, the foregoing set dynamic forwarding policy may be deleted, to avoid the impact on establishment of a subsequent session.

Figure 9:
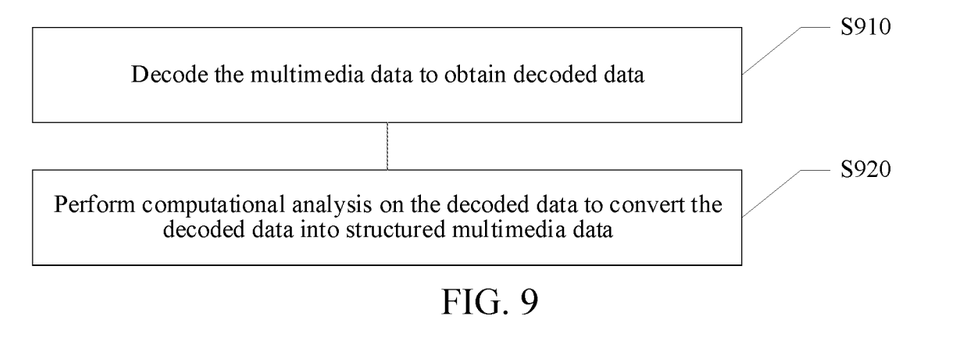
FIG. 9 is a schematic flowchart of steps of processing multimedia data according to one or more embodiments of the present disclosure.

Step S520: The media processing module deployed on an edge computing node receives, after the session is established between the media processing module and the terminal device, multimedia data transmitted by the terminal device, and processes the multimedia data.

In this exemplary implementation, the media processing module is deployed on the edge computing node. The media processing module may be responsible for processing of multimedia data, including reception of an audio-video media packet, decoding of audio-video data, audio-video content analysis based on a deep learning method, and the like. If audio-video content analysis is performed by using a deep learning method, the media processing module usually may need a GPU to improve computing performance in media analysis. Based on this, in this exemplary implementation, the processing the multimedia data may include step S910 and step S920.

Step S910: Decode the multimedia data to obtain decoded data.

In this exemplary implementation, lossless decoding may be performed on the multimedia data. That is, a decoded image is strictly the same as an original image, and compression is restorable or unbiased without distortion. To reduce a data volume, lossy decoding may be alternatively used. A decoding module may be a software module or a hardware module. This is not particularly limited in this exemplary embodiment.

Step S920: Perform computational analysis on the decoded data to convert the decoded data into structured multimedia data.

In this exemplary implementation, structural extraction may be performed on important information in content of the multimedia data, and processing means such as spatiotemporal segmentation, feature extraction, object recognition, and deep learning may be used to organize the important information into text information or visualized graphical information that can be understood by a computer or a person. Through structuring of the multimedia data, a large quantity of original surveillance videos that have slow response and of which a majority has no implementation value can be finely compressed, thereby greatly improving the search and investigation efficiency, and greatly reducing occupied storage space.

Referring to step S770 in FIG. 7 or step S880 in FIG. 8: After converting the multimedia data into structured multimedia data, the media processing module may further transmit the structured multimedia data to the remote node. For example, the media processing module transmits the structured multimedia data to the data processing module of the local network computing platform 106 or the Internet computing platform 107.

In this exemplary implementation, the data processing module may perform, according to requirements of products and by using the structured multimedia data, operations such as multimedia retrieval or recognition, for example, face retrieval, face recognition, and human body behavior analysis. For example, structured databases such as a face photo database, a face feature database, a behavior picture and feature library, and a vehicle image and feature library may be established based on processing structures, and a corresponding retrieval engine is established by combining the databases and associated video clip databases, to mine depth information of various databases and make full use of functions of big data, thereby improving implementation value of video data, and improving analysis and prediction functions for the video data.

In the multimedia data processing method in this exemplary implementation, the media processing module is deployed on the edge computing node, and the signaling processing module is deployed on the remote node. A quantity of deployed media processing modules depends on a quantity of accessed terminal devices, for example, a quantity of cameras. The signaling processing module only may need to process control signaling, and quantities of network resources and computing resources occupied by the signaling processing module are not large, so that one signaling processing module may be simultaneously responsible for sessions between a plurality of media processing modules distributed on different edge computing nodes and a plurality of terminal devices. For example, a SIP signaling processing module deployed on a general-purpose server having an X86 architecture can generally simultaneously support thousands of SIP calls, that is, can simultaneously process thousands of sessions between cameras and media processing modules that support a SIP. For example, the signaling processing module starts one or more service instances, and service requirements of media processing modules of all edge computing nodes and terminal devices in the whole network can be met. Therefore, based on the method in this exemplary implementation, a deployment mode applied to a multimedia data processing can be simplified, to significantly reduce deployment complexity of the edge computing nodes; and infrastructure resources required by the edge computing nodes can further be reduced, thereby reducing deployment costs.

In addition, because the signaling processing module is deployed on the remote node, installation, upgrade, and maintenance of the signaling processing module also become simpler and more convenient. For the edge computing node, the signaling processing module is a stateful computing service, and the media processing module is a stateless computing service. After the stateful signaling processing module is deployed on the remote node, there is only a stateless media processing module in the edge computing node, so that an edge computing service deployed in the edge computing node becomes a consistent single service type, and management and operation and maintenance work on the edge computing node become more efficient. Therefore, based on the method in this exemplary implementation, the operation and maintenance efficiency of the entire system can be greatly improved, and operation and maintenance costs can be reduced.

In addition, in the multimedia data processing method in this exemplary implementation, for the UPF entity, because it is unnecessary to offload signaling control traffic to the edge computing node, forwarding policy configuration of the UPF entity also becomes simpler and more convenient. Therefore, complexity of a traffic offloading function of the entire system can further be reduced.

Descriptions are made in the foregoing exemplary embodiments by using the video surveillance implementation scenario as an example. In other exemplary embodiments of the present disclosure, the multimedia data processing method in the present disclosure may be alternatively applicable to other implementation scenarios such as voice monitoring, an Internet of vehicles and automatic driving implementation, video on-demand, and game entertainment, which also fall within the protection scope of the present disclosure.

Although the steps of the method in the present disclosure are described in a specific order in the accompanying drawings, this does not require or imply that the steps are bound to be performed in the specific order, or all the steps shown are bound to be performed to achieve an expected result. Additionally or alternatively, some steps may be omitted, a plurality of steps may be combined into one step for execution, and/or one step may be decomposed into a plurality of steps for execution, and the like.

Figure 10:
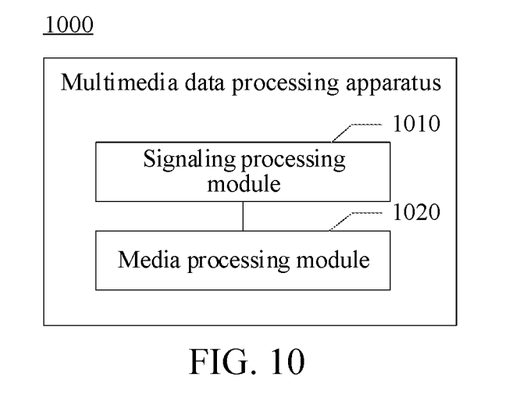
FIG. 10 is a schematic block diagram of a multimedia data processing apparatus according to one or more embodiments of the present disclosure.

Further, in this exemplary implementation, a multimedia data processing apparatus is further provided. Referring to FIG. 10, the multimedia data processing apparatus 1000 may include a signaling processing module 1010 and a media processing module 1020.

The signaling processing module 1010 is deployed on a remote node, and is configured to: establish a session between a terminal device and the media processing module 1020, and control the session.

The media processing module 1020 is deployed on an edge computing node, and is configured to: receive, after the session is established between the media processing module and the terminal device, multimedia data transmitted by the terminal device, and process the multimedia data.

In this exemplary implementation, the apparatus includes a plurality of signaling processing modules 1010 and a plurality of media processing modules 1020, a quantity of the signaling processing modules 1010 being less than a quantity of the media processing modules 1020.

In this exemplary implementation, the apparatus includes one signaling processing module 1010 and a plurality of media processing modules 1020.

In this exemplary implementation, the remote node includes a local network computing platform and/or an Internet computing platform.

In this exemplary implementation, the signaling processing module 1010 establishes the session between the terminal device and the media processing module 1020 through the following steps: initiating a call request including information about a data reception address to the terminal device; receiving response information of the terminal device for the call request, the response information including information about a data transmission address; transmitting the information about the data transmission address to the media processing module 1020, and instructing the media processing module 1020 to receive the multimedia data according to the data reception address; and transmitting session establishment information to the terminal device.

In this exemplary implementation, the signaling processing module 1010 is further configured to: pre-configure a forwarding policy in a UPF entity deployed on the edge computing node, the forwarding policy including: forwarding multimedia data whose receiving port is within a preset range to the media processing module 1020, the information about the data reception address including a target receiving port within the preset range.

In this exemplary implementation, the information about the data reception address includes a target receiving port; and before performing the step of transmitting the information about the data transmission address to the media processing module 1020, the signaling processing module 1010 is further configured to: configure a forwarding policy in a UPF entity deployed on the edge computing node, the forwarding policy including: forwarding multimedia data whose receiving port is the target receiving port to the media processing module 1020.

In this exemplary implementation, the signaling processing module 1010 is further configured to: delete the forwarding policy after the session is ended.

In this exemplary implementation, the apparatus includes: a UPF entity, configured to forward, according to the forwarding policy, the multimedia data transmitted by the terminal device to the media processing module 1020.

In this exemplary implementation, the controlling the session includes: keeping the session and ending the session.

In this exemplary implementation, the media processing module 1020 processes the multimedia data through the following steps: decoding the multimedia data to obtain decoded data; and performing computational analysis on the decoded data to convert the decoded data into structured multimedia data.

In this exemplary implementation, the media processing module 1020 is further configured to: transmit the structured multimedia data to the remote node.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Details of the modules or units of the multimedia data processing apparatus have been described in the corresponding multimedia data processing method. Therefore, details are not described herein again.

Although a plurality of modules or units of a device configured to perform actions are discussed in the foregoing detailed description, such division is not mandatory. Actually, according to the implementations of the present disclosure, the features and functions of two or more modules or units described above may be implemented in one module or unit. On the contrary, the features and functions of one module or unit described above may be further divided to be embodied by a plurality of modules or units.

Other implementations of the present disclosure are apparent to a person skilled in the art from consideration of the present disclosure and practice of the present disclosure. The present disclosure is intended to cover any variations, uses, or adaptive changes of the present disclosure. These variations, uses, or adaptive changes follow the general principles of the present disclosure and include common general knowledge or common technical means in the art, which are not disclosed in the present disclosure. The present disclosure and the embodiments are considered as merely exemplary, and the scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A multimedia data processing method, comprising:
   establishing, by a remote node, a session between a terminal device and an edge computing node, and controlling the session, wherein a UPF (user plane function) entity in the edge computing node communicates with a UPF entity in the remote node;
   receiving, by the edge computing node after the session is established between the edge computing node and the terminal device, multimedia data transmitted by the terminal device, wherein the multimedia data includes data of a video, and processing the multimedia data;
   performing, by the edge computing node, an analysis of the video based on a graphics processing unit (GPU) to output structured video data;
   transmitting, by the edge computing node, the structured video data to the remote node; and
   performing, by the remote computing node, an analysis of the structured video data.

2. The multimedia data processing method according to claim 1, further comprising:
   pre-configuring a forwarding policy in the user plane function (UPF) entity in the edge computing node, the forwarding policy including:
   forwarding multimedia data whose receiving port is within a preset range to a media processing module deployed on the edge computing node.

3. The multimedia data processing method according to claim 1, further comprising:
   deleting the forwarding policy after the session is ended.

4. The multimedia data processing method according to claim 1, wherein controlling the session comprises:
   keeping the session and ending the session.

5. The multimedia data processing method according to claim 1, wherein processing the multimedia data comprises:
   decoding, by the edge computing node, the multimedia data to obtain decoded data; and
   performing, by the edge computing node, computational analysis on the decoded data to convert the decoded data into the structured multimedia data.

6. The multimedia data processing method according to claim 5, further comprising:
   transmitting, by the edge computing node, the structured multimedia data to the remote node.

7. A multimedia data processing apparatus, comprising: a memory storing computer program instructions; and a processor coupled to the memory and configured to execute the computer program instructions and perform:
   establishing, by a remote node, a session between a terminal device and an edge computing node, and controlling the session, wherein a UPF (user plane function) entity in the edge computing node communicates with a UPF entity in the remote node;
   receiving, by the edge computing node after the session is established between the edge computing node and the terminal device, multimedia data transmitted by the terminal device, wherein the multimedia data includes data of a video, and processing the multimedia data;
   performing, by the edge computing node, an analysis of the video based on a graphics processing unit (GPU) to output structured video data;
   transmitting, by the edge computing node, the structured video data to the remote node; and
   performing, by the remote computing node, an analysis of the structured video data.

8. The multimedia data processing apparatus according to claim 7, wherein the processor is further configured to execute the computer program instructions and perform:
   pre-configuring a forwarding policy in the user plane function (UPF) entity in the edge computing node, the forwarding policy including:
   forwarding multimedia data whose receiving port is within a preset range to a media processing module deployed on the edge computing node.

9. The multimedia data processing apparatus according to claim 7, wherein the processor is further configured to execute the computer program instructions and perform:
   deleting the forwarding policy after the session is ended.

10. The multimedia data processing apparatus according to claim 7, wherein controlling the session comprises:
    keeping the session and ending the session.

11. The multimedia data processing apparatus according to claim 7, wherein processing the multimedia data comprises:
    decoding, by the edge computing node, the multimedia data to obtain decoded data; and
    performing, by the edge computing node, computational analysis on the decoded data to convert the decoded data into the structured multimedia data.

12. The multimedia data processing apparatus according to claim 11, wherein the processor is further configured to execute the computer program instructions and perform:
    transmitting, by the edge computing node, the structured multimedia data to the remote node.

13. A non-transitory computer-readable storage medium storing computer program instructions executable by at least one processor to perform:
    establishing, by a remote node, a session between a terminal device and an edge computing node, and controlling the session, wherein a UPF (user plane function) entity in the edge computing node communicates with a UPF entity in the remote node;
    receiving, by the edge computing node after the session is established between the edge computing node and the terminal device, multimedia data transmitted by the terminal device, wherein the multimedia data includes data of a video, and processing the multimedia data;

performing, by the edge computing node, an analysis of the video based on a graphics processing unit (GPU) to output structured video data;

transmitting, by the edge computing node, the structured video data to the remote node; and performing, by the remote computing node, an analysis of the structured video data.

14. The multimedia data processing method according to claim 1, wherein the UPF entity in the edge computing node communicates through a real-time transport protocol (RTP), and wherein the remote node communicates through a session initiation protocol (SIP) or a real-time stream protocol (RTSP).

15. The multimedia data processing method according to claim 1, wherein the terminal device is a first terminal device and the edge computing node is a first edge computing node, and wherein the method further comprises:

establishing, by the remote node, a session between a second terminal device and the second edging computing node, the second terminal device being separate from the first terminal device and the second edging computing node being separate from the first edging computing node.

16. The multimedia data processing method according to claim 1, wherein the terminal device includes a camera, the multimedia data is transmitted by the camera, and the method further comprises:

sending, by the remote node, a call request to the camera; and receiving, by the remote node, return response information from the camera, the return response information including a camera identifier and a source IP address for transmitting the multimedia data by the camera.

17. The multimedia data processing method according to claim 16, further comprising:

receiving, by the UPF entity in the edge computing node, a multimedia data packet from the camera; and transmitting, by the UPF entity in the edge computing node, the multimedia data packet to a media processing module according to a preset forwarding policy.

18. The multimedia data processing method according to claim 1, wherein a mobile edge computing (MEC) application is deployed on the edge computing node, and the method further comprises:

implementing, by the MEC application of the edge computing node, content download in a network; and forwarding, by the UPF entity in the edge computing node, network traffic not processed by the MEC application to the UPF entity in the remote node.

* * * * *